(12) United States Patent
Xue et al.

(10) Patent No.: US 9,009,956 B2
(45) Date of Patent: Apr. 21, 2015

(54) SINGLE PHASE INVERTER TOPOLOGY METHOD

(75) Inventors: Yaosuo Xue, Plainsboro, NJ (US);
Madhav Manjrekar, Cary, NC (US)

(73) Assignee: Siemens Aktiengesellschaft, Munich (DE)

( * ) Notice: Subject to any disclaimer, the term of this patent is extended or adjusted under 35 U.S.C. 154(b) by 378 days.

(21) Appl. No.: 13/522,419

(22) PCT Filed: Feb. 15, 2011

(86) PCT No.: PCT/US2011/024864
§ 371 (c)(1),
(2), (4) Date: Oct. 3, 2012

(87) PCT Pub. No.: WO2011/100738
PCT Pub. Date: Aug. 18, 2011

(65) Prior Publication Data
US 2013/0014384 A1    Jan. 17, 2013

Related U.S. Application Data

(60) Provisional application No. 61/304,538, filed on Feb. 15, 2010.

(51) Int. Cl.
*H05K 3/20* (2006.01)
*H02M 7/483* (2007.01)
*H02M 7/49* (2007.01)
*H02M 7/487* (2007.01)

(52) U.S. Cl.
CPC .......... *H02M 7/483* (2013.01); *Y10T 29/49117* (2015.01); *H02M 7/49* (2013.01); *H02M 7/487* (2013.01); *H02M 2007/4835* (2013.01)

(58) Field of Classification Search
USPC ............. 29/417, 592.1, 602.1, 740, 741, 742, 29/759, 831, 832; 361/717, 707, 704
See application file for complete search history.

(56) References Cited

U.S. PATENT DOCUMENTS

| | | | | |
|---|---|---|---|---|
| 8,278,892 | B2 * | 10/2012 | Friebe et al. | 323/271 |
| 8,279,649 | B2 * | 10/2012 | Esram et al. | 363/132 |
| 8,467,200 | B2 * | 6/2013 | Pan et al. | 363/21.02 |
| 8,503,200 | B2 * | 8/2013 | Chapman et al. | 363/41 |
| 8,670,249 | B2 * | 3/2014 | Khajehoddin et al. | 363/39 |

OTHER PUBLICATIONS

Tehrani et al., A new multilevel inverter model NP without clamping diodes, Industrial Electronics, 2008, IECON 2008, 34th Annual Conference of IEEE, Piscataway, NJ, Nov. 10, 2008, pp. 466-472.
Agelidis et al., Proceedings of the IEEE International Symposium on Industrial Electronics, 1997, vol. 2, Jul. 7, 1997, pp. 589-594.

(Continued)

*Primary Examiner* — Paul D Kim

(57) ABSTRACT

Systems and methods are described that provide multilevel inverters having a plurality of levels using a simplified topology. For single phase systems, embodiments provide a full-bridge topology using bidirectional switching interconnections.

22 Claims, 15 Drawing Sheets

(56) References Cited

OTHER PUBLICATIONS

Hinga et al., "A new PWM inverter for photovoltaic power generation system", Power Electronics Specialists Conference, PESC '94 Record, 25 Annual IEEE Taipei, Taiwan, Jun. 20-25, 1994, pp. 391-395.

Babaei et al., "A Novel Structure for Multilevel Converters", Electrical Machines and Systems, 2005, ICEMS 2005, Proceedings of the Eighth International Conference on Nanjing, China, Sep. 27-29, 2005, vol. 2, Sep. 27, 2005, pp. 1278-1283.

Akira et al., "A New Neutral-Point-Clamped PWM Inverter", IEEE Transactiosn on Industry Applications, IEEE Service Center, Piscataway, NJ, vol. 43, No. 5, Sep. 1, 1981, pp. 518-523.

* cited by examiner

| $V_A$ | $V_B$ | $V_{AB}$ | $S_1$ | $S_2$ | $S_3$ | $S_4$ | $S_5$ | $S_6$ |
|---|---|---|---|---|---|---|---|---|
| +½V | -½V | +V | 1 | 0 | 0 | 1 | 0 | 0 |
| +½V | 0 | +½V | 1 | 0 | 0 | 0 | 0 | 1 |
| 0 | -½V | +½V | 0 | 0 | 0 | 1 | 1 | 0 |
| +½V | +½V | 0 | 1 | 1 | 0 | 0 | 0 | 0 |
| 0 | 0 | 0 | 0 | 0 | 0 | 0 | 1 | 1 |
| -½V | -½V | 0 | 0 | 0 | 1 | 1 | 0 | 0 |
| -½V | 0 | -½V | 0 | 1 | 0 | 0 | 1 | 0 |
| 0 | +½V | -½V | 0 | 0 | 1 | 0 | 0 | 1 |
| -½V | +½V | -V | 0 | 1 | 1 | 0 | 0 | 0 |

FIG. 6A

| $V_A$ | $V_B$ | $V_{AB}$ | $S_1$ | $S_2$ | $S_3$ | $S_4$ | $S_5$ | $S_6$ |
|---|---|---|---|---|---|---|---|---|
| +½V | -½V | +V | 1 | 0 | 0 | 1 | N/A | 0 |
| +½V | 0 | +½V | 1 | 0 | 0 | 0 | N/A | 1 |
| +½V | +½V | 0 | 1 | 1 | 0 | 0 | N/A | 0 |
| -½V | -½V | 0 | 0 | 0 | 1 | 1 | N/A | 0 |
| 0 | +½V | -½V | 0 | 0 | 1 | 0 | N/A | 1 |
| -½V | +½V | -V | 0 | 1 | 1 | 0 | N/A | 0 |

FIG. 6B

| $V_{AB}$ | conducting switches for 7-level inverter | | | | |
|---|---|---|---|---|---|
| | full | | | | reduced |
| +V | $S_1$, $S_4$ & $S_6$ | | | | $S_1$ & $S_4$ |
| -V | $S_2$, $S_3$ & $S_5$ | | | | $S_2$ & $S_3$ |
| +⅔V | $S_1$, $S_4$ & $S_{10}$ | $S_7$, $S_4$ & $S_6$ | | | $S_7$ & $S_4$ |
| -⅔V | $S_2$, $S_3$ & $S_9$ | $S_8$, $S_3$ & $S_5$ | | | $S_8$ & $S_3$ |
| +⅓V | $S_1$ & $S_8$ | $S_7$, $S_4$ & $S_{10}$ | $S_9$, $S_3$, $S_4$ & $S_6$ | | $S_1$ & $S_8$ |
| -⅓V | $S_2$ & $S_7$ | $S_8$, $S_3$ & $S_9$ | $S_{10}$, $S_4$, $S_3$ & $S_5$ | | $S_2$ & $S_7$ |
| 0 | $S_1$ & $S_2$ | $S_7$ & $S_8$ | $S_9$, $S_3$, $S_4$ & $S_{10}$ | $S_5$, $S_3$, $S_4$ & $S_6$ | $S_1$ & $S_2$ or $S_7$ & $S_8$ or $S_3$ & $S_4$ |

| levels | equal DC caps | embodiment topology switches | | existing topology switches |
|---|---|---|---|---|
| | | full | reduced | |
| 3 | 1 | 4 | 4 | 4 |
| 5 | 2 | 8 | 6 | 8 |
| 7 | 3 | 14 | 8 | 12 |
| 9 | 4 | 20 | 14 | 16 |
| 11 | 5 | 26 | 14 | 20 |
| 13 | 6 | 32 | 20 | 24 |
| 15 | 7 | 38 | 20 | 28 |
| ... | ... | ... | ... | ... |
| $m$ | $\frac{m-1}{2}$ | for $m \geq 5$, $2(m-1)+(m-5)$ | for $m=7, 11, 15, ...$ $2(m-1)-\frac{m-5}{2}-3$ for $m=9, 13, 17, ...$ $2(m-1)-\frac{m-5}{2}$ | $2(m-1)$ |

FIG. 13

| | embodiment topology | diode clamped | flying capacitors | cascade |
|---|---|---|---|---|
| DC bus capacitors | $\frac{m-1}{2}$ | $\frac{m-1}{2}$ or $m-1(*)$ | $\frac{m-1}{2}$ or $m-1(*)$ | $\frac{m-1}{2}$ |
| clamping diodes | 0 | $(m-1)(m-2)$ | 0 | 0 |
| balancing capacitors | 0 | 0 | $\frac{(m-1)(m-2)}{2}$ | 0 |

* NUMBER OF DC-BUS CAPACITORS FOR HALF-BRIDGE TOPOLOGIES

FIG. 14

SINGLE PHASE INVERTER TOPOLOGY METHOD

CROSS REFERENCE TO RELATED APPLICATIONS

This application claims the benefit of U.S. Provisional Application No. 61/304,538, filed on Feb. 15, 2010, the disclosure which is incorporated herein by reference in its entirety.

BACKGROUND OF THE INVENTION

The invention relates generally to DC to ac inverters. More specifically, the invention relates to methods and systems for multilevel inverters having a simplified topology.

Today, the power industry has revived and entered a new age using renewable energy, and high efficiency power generation, transmission and distribution where multilevel power converters can assume significant roles.

Multilevel power converters emerged from the realization that single power semiconductors cannot meet the voltage requirements required for medium voltage power conversion. Multilevel power conversion has rapidly grown in the field of power engineering for the applications of medium voltage ac drive, Flexible AC Transmission System (FACTS) devices, Medium Voltage DC (MVDC) transmission, and High Voltage DC (HVDC) transmission systems. Despite today's high power semiconductor technology that has reached 6.5 kV and 2.5 kA power ratings, multilevel power converters built with mature medium power semiconductor technology present competitive alternative solutions with many advantages over conventional 2-level converters due to their ability to synthesize waveforms exhibiting lower distortion and better harmonic cancellation, smaller $$\frac{dv}{dt}$$

and common-mode voltage, and low switching frequency operation, and attain higher voltages using semiconductor devices with smaller voltage ratings.

Topologically, a multilevel structure can be considered as an ac voltage synthesizer realized from multiple discrete DC voltage sources. Multiple, equal DC sources are required. Multilevel inverters provide an ac output waveform at discrete voltage levels. The more steps or levels generate a smoother sinusoidal waveform and reduce the amount of output filtering. Practically, it is a trade-off to select the number of levels considering the converter complexity and filter requirements. By optimizing the angles and heights of steps, certain lower order harmonics can be cancelled. In addition, the harmonics spectrum can be reduced by using Pulse Width Modulation (PWM) techniques at each level.

Numerous multilevel inverter topologies have been proposed and studied for power utility and motor drive applications. FIGS. 1A and 1B show prior art half-bridge and full-bridge diode-clamped or neutral-point-clamped (NPC) inverters. FIGS. 2A and 2B show prior art half-bridge and full-bridge capacitor-clamped or flying-capacitor inverters. FIG. 3 shows a prior art cascaded H-bridge inverter with separate dc supplies and an ac output at nodes A and B. FIG. 4 shows a prior art topology that replaces an H-bridge architecture with cascaded 2-terminal submodules without separate dc sources to form a modular structure.

The diode-clamped multilevel converter is the most widely used inverter topology. However, this topology is cumbersome to implement for levels beyond five.

There is a need for a simplified inverter topology that allows for levels greater than five.

SUMMARY OF THE INVENTION

The inventors have discovered that it would be desirable to have methods and systems for multilevel inverters having a plurality of levels using a simplified topology. For single phase systems, embodiments provide a full-bridge topology using unidirectional and bidirectional controlled switching interconnections. Since the ac output is obtained differentially, the required amount of DC sources can be reduced by half.

Embodiments provide a class of single phase multilevel inverter topologies using a full-bridge approach with bidirectional interconnections. Compared to diode-clamped or flying-capacitor multilevel topologies, the required split-rail dc inputs are less, and the required power switch number can be reduced by removing redundant switching states. With asymmetrical DC sources, the number of output levels may be increased in the proposed generalized multilevel structure.

One aspect of the invention provides a method for a single phase inverter topology. Methods according to this aspect of the invention comprise selecting a number of desired inverter output levels m, where m≥5, is an integer and an odd number, determining a number of equal DC sources n, where $$n = \frac{m-1}{2},$$

coupling the n DC sources in series, wherein the source series has a first DC source that defines a positive node P and a last DC source that defines a negative node N, defining one or more source series nodes between each DC source in the source series wherein the source series node after the first DC source that defines a positive node P is the first source series node and the source series node before the last DC source that defines a negative node N is the last source series node, determining a number of unidirectional controlled switches ucs, assembling one or more inverter cells, wherein an inverter cell comprises six unidirectional controlled switches and the quotient of $$\frac{ucs}{6}$$

determines the number of inverter cells required for the selected number of inverter output levels m, arranging four of the unidirectional controlled switches for each inverter cell as two bidirectional controlled switches, for each inverter cell, coupling two bidirectional controlled switches together forming a cell series node and coupling the other terminal of each bidirectional controlled switch to the emitter terminal of one unidirectional controlled switch forming two cell nodes, coupling the cell series node of a cell to the first source series node and coupling the collector terminals of the cell's two unidirectional controlled switches to the node P, for each remaining inverter cell, coupling the cell series node to a following source series node and coupling each unidirectional controlled switch's collector terminal to a respective cell node of a previous inverter cell, and coupling the emitter terminal for each of the two remaining unidirectional controlled switches to the node N and coupling the each collector terminal to a respective cell node of the last inverter cell.

Another aspect of the invention is a single phase inverter topology method. Methods according to this aspect of the invention comprise selecting a number of desired inverter output levels m, where m≥5, is an integer and an odd number, determining a number of equal DC sources n, where $$n = \frac{m-1}{2},$$

coupling the n DC sources in series, wherein the source series has a first DC source that defines a positive node P and a last DC source that defines a negative node N, defining one or more source series nodes between each DC source in the source series wherein the source series node after the first DC source that defines a positive node P is the first source series node and the source series node before the last DC source that defines a negative node N is the last source series node, determining a number of unidirectional controlled switches ucs, assembling one or more inverter cells, wherein an inverter cell comprises six unidirectional controlled switches and the quotient of $$\frac{ucs}{6}$$

determines the number of inverter cells required for the selected number of inverter output levels m, arranging four of the unidirectional controlled switches for each inverter cell as two bidirectional controlled switches, for each inverter cell, coupling two bidirectional controlled switches together forming a cell series node and coupling the other terminal of each bidirectional controlled switch to the emitter terminal of one unidirectional controlled switch foaming two cell nodes, coupling the cell series node of a first inverter cell to the last source series node and coupling the emitter terminal for each of the two remaining unidirectional controlled switches to the node N and coupling each collector terminal to a respective cell node of the first inverter cell, for each remaining inverter cell, coupling the cell series node to a previous source series node and coupling each cell node to a unidirectional controlled switch's collector terminal of a following inverter cell, and for the last inverter cell, coupling the collector terminals of the last cell's two unidirectional controlled switches to the node P.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 6A is a table showing the power switching for the full topology 5-level inverter in FIG. 5A.

FIG. 6B is a table showing the power switching for the reduced topology 5-level inverter in FIG. 5B.

FIG. 13 is a table comparing the number of switching devices for full and reduced embodiment topologies and the prior art.

FIG. 14 is a table comparing the number of components between embodiments and the prior art.

DETAILED DESCRIPTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having," and variations thereof herein is meant to encompass the items listed thereafter and equivalents thereof as well as additional items.

The terms "connected" and "coupled" are used broadly and encompass both direct and indirect connecting, and coupling. Further, "connected" and "coupled" are not restricted to physical or mechanical connections or couplings.

It should be noted that the invention is not limited to any particular software language described or that is implied in the figures. One of ordinary skill in the art will understand that a variety of software languages may be used for implementation of the invention. It should also be understood that some of the components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, system frameworks, and a computer-usable medium storing computer-readable instructions that provide multilevel inverters having a plurality of levels using a simplified topology. The invention may be deployed as software as an application program tangibly embodied on a program storage device. The application code for execution can reside on a plurality of different types of computer readable media known to those skilled in the art.

Figure 1A:
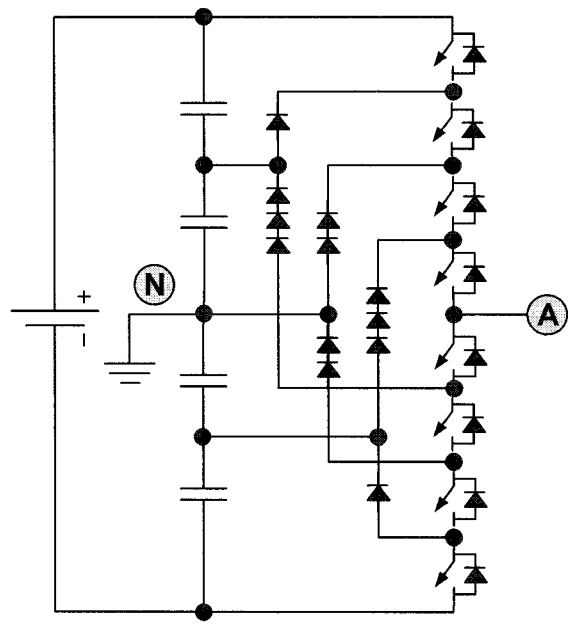
FIG. 1A is a prior art half-bridge diode-clamped 5-level inverter topology.
Figure 1B:
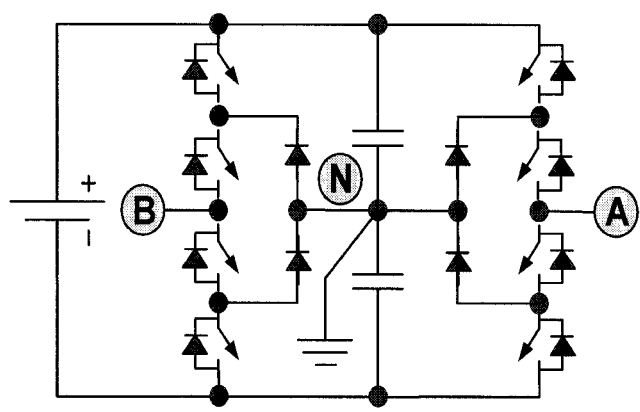
FIG. 1B is a prior art full-bridge diode-clamped 5-level inverter topology.
Figure 2A:
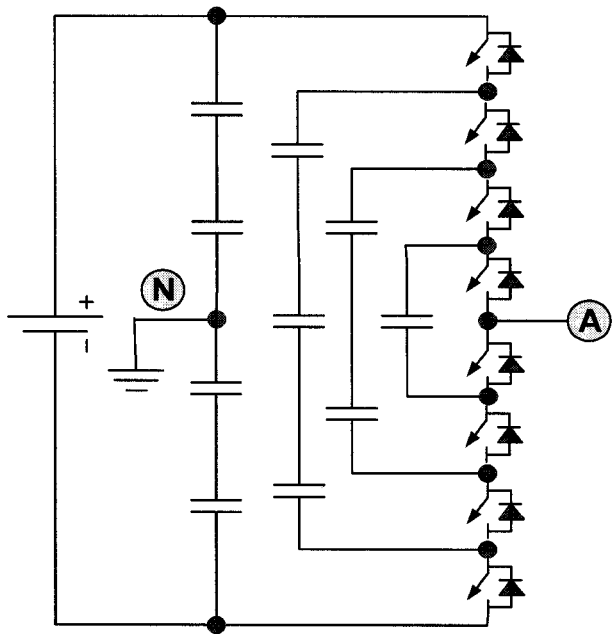
FIG. 2A is a prior art half-bridge flying-capacitor 5-level inverter topology.
Figure 2B:
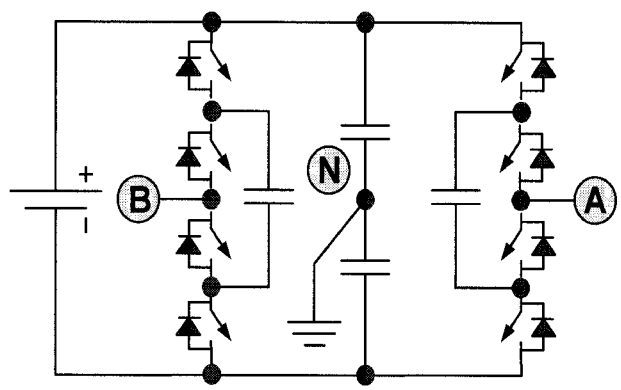
FIG. 2B is a prior art full-bridge flying-capacitor 5-level inverter topology.
Figure 3:
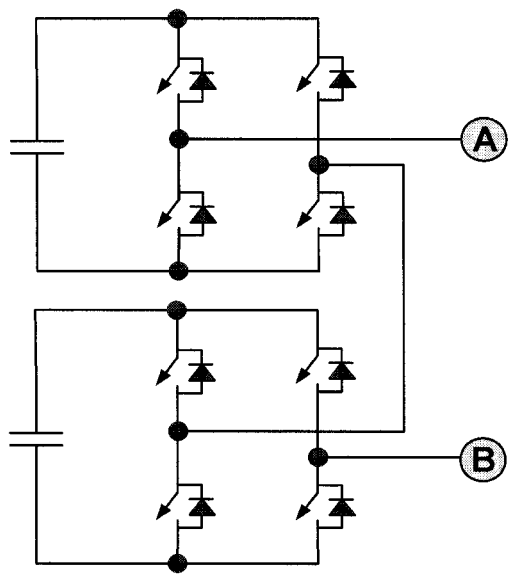
FIG. 3 is a prior art cascaded H-bridge 5-level inverter topology.
Figure 4:
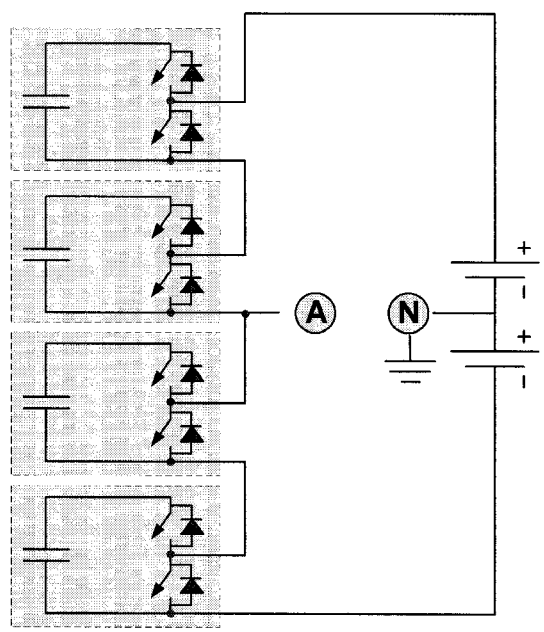
FIG. 4 is a prior art modular 5-level inverter topology.
Figure 5A:
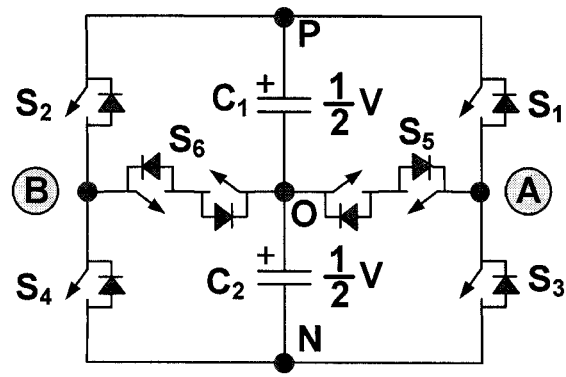
FIG. 5A is an exemplary 5-level inverter topology with a full number of power semiconductor switches.

FIG. 5A shows a 5-level single phase inverter topology with ac obtained between differential output nodes A and B. The 5-level inverter comprises four unidirectional controlled switches $S_1$, $S_2$, $S_3$, $S_4$, two bidirectional controlled switches $S_5$, $S_6$ and two DC sources $$\frac{1}{2}V, \frac{1}{2}V$$

in series. Typical unidirectional controlled switches comprise power semiconductors such as Insulated-Gate Bipolar Transistors (IGBTs) with an anti-parallel diode across their emitter-collector junctions. An IGBT is a three-terminal power semiconductor device having an isolated Field Effect Transistor (FET) for the control input (gate) and a bipolar power transistor as a switch (collector-emitter). The power semiconductor devices can also be Metal-Oxide-Semiconductor Field-Effect Transistors (MOSFETs), Integrated Gate-Commutated Thyristors (IGCTs), Gate Turn-Off Thyristors (GTOs), or other types. The IGBT emitter is equivalent to a MOSFET source, or an IGCT or GTO anode. The IGBT collector is equivalent to a MOSFET drain or an IGCT or GTO cathode. For this disclosure, the unidirectional controlled switches are treated as two terminal (collector-emitter) devices. For the unidirectional controlled switches $S_1$, $S_2$, $S_3$, $S_4$ the anode of the anti-parallel diode is coupled to the emitter. A bidirectional controlled switch can be formed by coupling together the emitters of two unidirectional controlled switches. The two DC sources $$\frac{1}{2}V, \frac{1}{2}V$$

may be two discrete DC supplies or two capacitors ($C_1$,$C_2$), which split one common DC supply (V) across nodes P and N into two discrete DC supplies in series. The total number of unidirectional and bidirectional controlled switches (six) is the same as used in a prior art 5-level topology. The neutral ground node O can be positioned flexibly since 0 Vac is obtained differentially and not by clamping to a neutral.

To avoid short circuiting the DC bus or the two DC sources $$\frac{1}{2}V, \frac{1}{2}V$$

the following constraints are imposed on the switch control scheme:
$S_1$ and $S_3$ can not be turned on simultaneously;
$S_1$ and $S_5$ can not be turned on simultaneously;
$S_3$ and $S_5$ can not be turned on simultaneously;
$S_2$ and $S_4$ can not be turned on simultaneously;
$S_2$ and $S_6$ can not be turned on simultaneously; and
$S_4$ and $S_6$ cannot be turned on simultaneously.

Under these switching constraints, a 5-level ac output waveform is synthesized from the differential voltage across output nodes A and B. For convenience, the series source node between the two DC sources $$\frac{1}{2}V, \frac{1}{2}V$$

is grounded. Output nodes A and B can be switched using the four unidirectional controlled switches $S_1$, $S_2$, $S_3$, $S_4$ and two bidirectional controlled switches $S_5$, $S_6$ to connect to the positive P, common O, and negative N DC nodes (potentials).

FIG. 6A shows a table listing all combinations of switch $S_n$ states that generate a 5-level sinusoid ($V_{AB}$) at output nodes A and B. At any time, only two switches are required to be closed to output a specific voltage level. The redundant switching choices can be alternated cycle by cycle to balance the DC source voltage sharing and utilization.

Figure 5B:
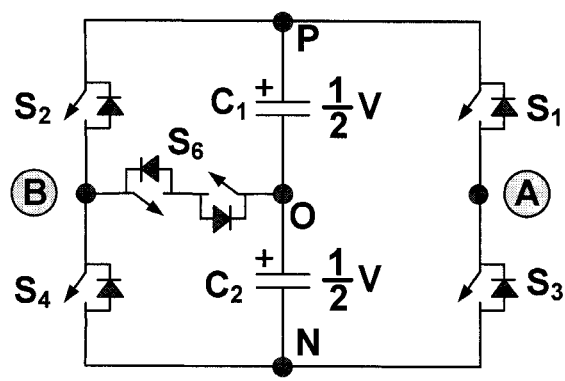
FIG. 5B is an exemplary 5-level inverter topology with a reduced number of power semiconductor switches.

FIG. 5B shows a 5-level inverter topology using four unidirectional ($S_1$, $S_2$, $S_3$, $S_4$) and one bidirectional ($S_6$) controlled switches. The required output voltage levels are still achieved with the removal of one bidirectional controlled switch $S_5$ from the full topology (FIG. 5A). FIG. 6B shows a table listing all combinations of the switch $S_n$ states.

Figure 7:
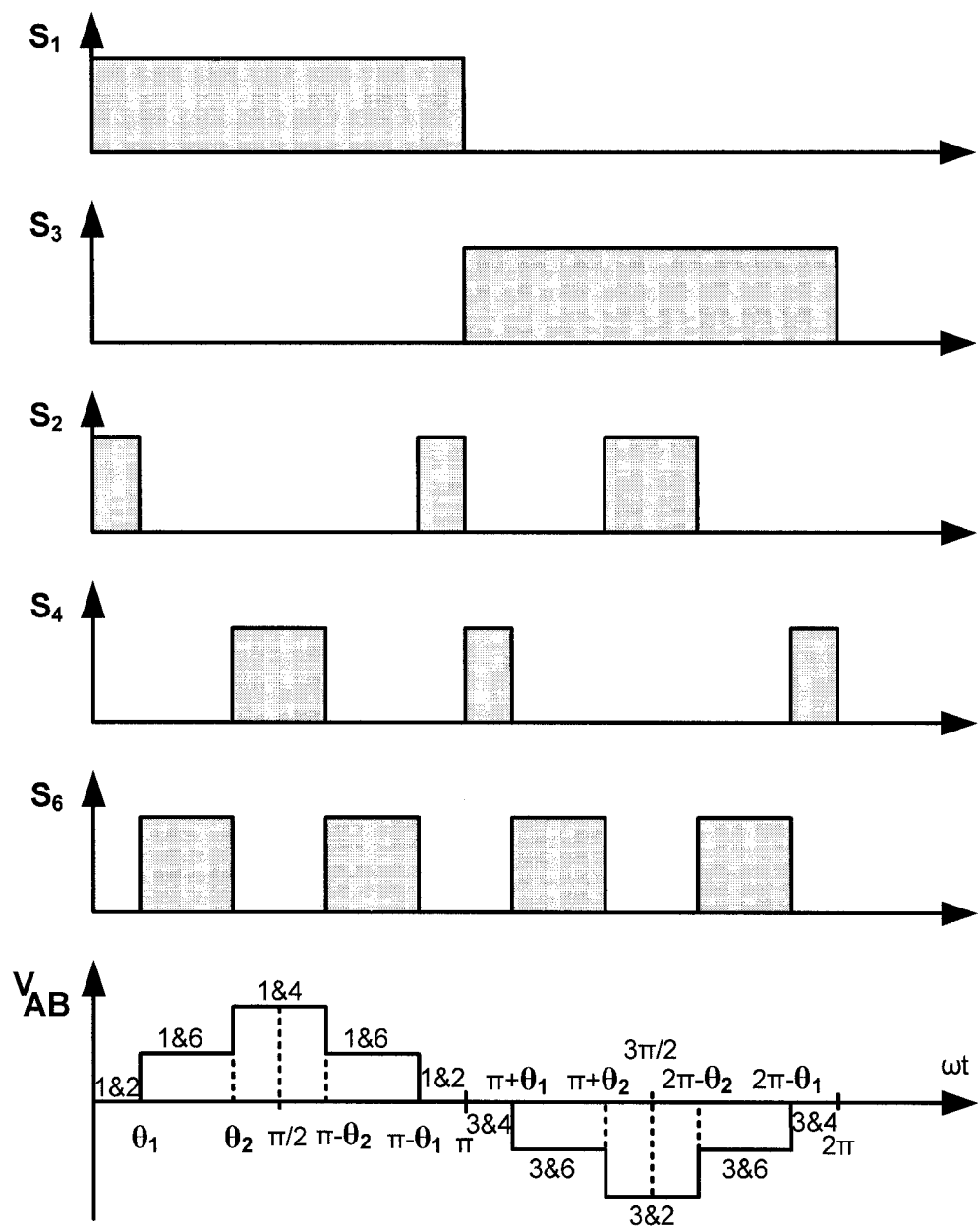
FIG. 7 is an exemplary plot of the power switching and $V_{AB}$ output for the reduced topology 5-level inverter in FIG. 5B.

During the positive half cycle, node A is clamped to node P ($S_1$=ON, $S_3$=OFF) and node B is switched among nodes P, O, or N to obtain 0V, $$+\frac{1}{2}V$$

and +V respectively. During the negative half cycle, node A is clamped to node N ($S_1$=OFF, $S_3$=ON) and node B is switched among nodes N, O, or P to obtain 0V, $$-\frac{1}{2}V,$$

and −V respectively. FIG. 7 shows the switch conduction states $S_1$, $S_2$, $S_3$, $S_4$, $S_6$ and resultant output ac ($V_{AB}$) for one cycle for the reduced topology 5-level inverter shown in FIG. 5B.

Figure 8:
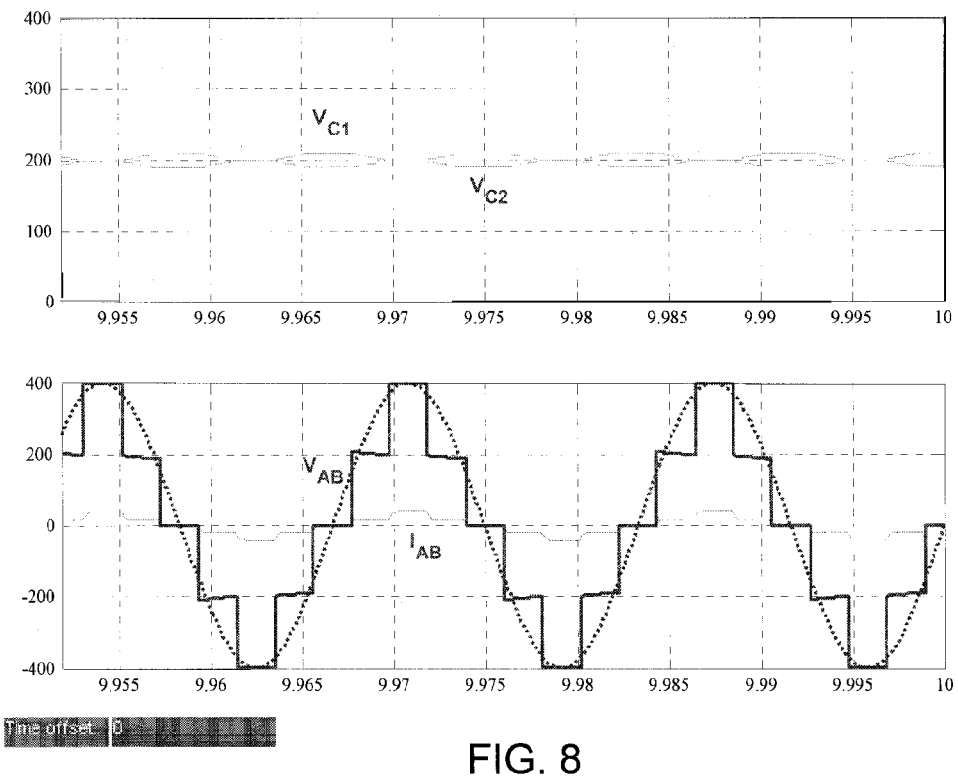
FIG. 8 is an exemplary plot of capacitor voltage and Vac output for the reduced topology 5-level inverter in FIG. 5B under light load.
Figure 9:
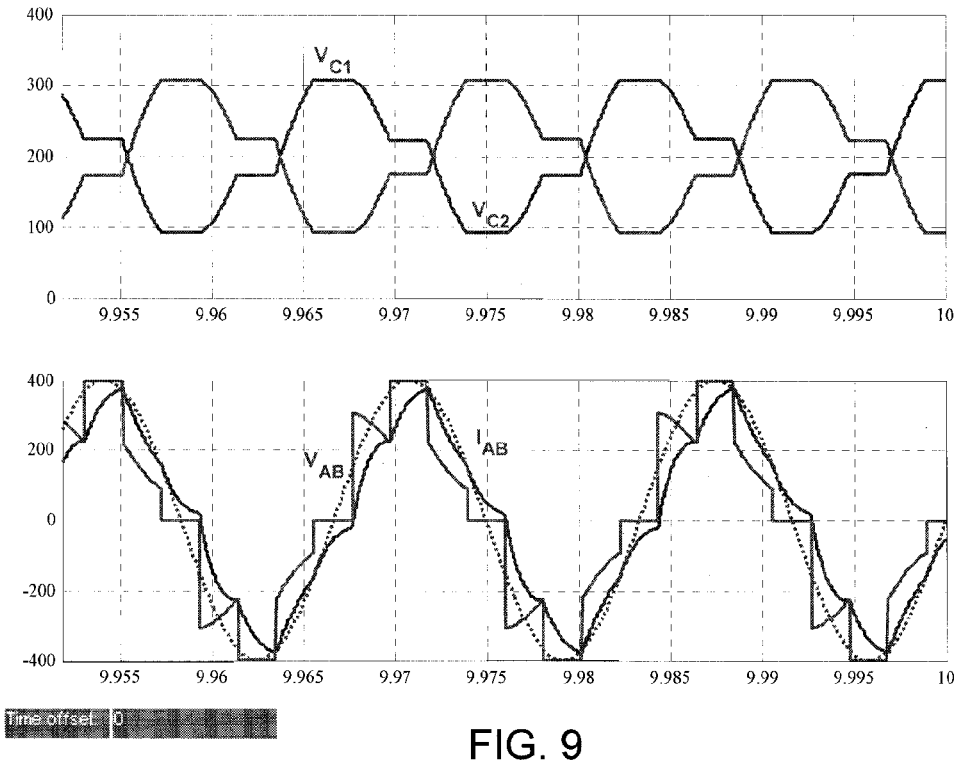
FIG. 9 is an exemplary plot of capacitor voltage and Vac output for the reduced topology 5-level inverter in FIG. 5B under heavy load.

A MATLAB/Simulink model of the embodiment was built to simulate the basic operating principle. Under the lowest frequency switching scheme (close to the fundamental frequency, 60 Hz). FIGS. 8 and 9 plot the DC sources $$\frac{1}{2}V, \frac{1}{2}V$$

configured as capacitors $C_1$, $C_2$ (with one common DC supply (V) across nodes P and N), their voltages $V_{C_1}$, $V_{C_2}$ under different ac load conditions (top plots) and an observed ac waveform generated (bottom plots).

Two zero voltage states are used alternatively to balance the capacitor voltages $V_{C_1}$, $V_{C_2}$. FIG. 8 (upper plot) shows that when capacitors $C_1$ and $C_2$ are large enough (2,000 μF, 400

VDC) and the ac load is not heavy (10Ω and 1 mH in series), the output (lower plot) $V_{AB}$ waveform (stepped line) will be odd-symmetric and mirror-symmetric, which eliminates the DC component and all even-order harmonics. To cancel certain lower-order harmonics, the proper angle for each level of the 5-level inverter is chosen to satisfy $$\frac{4V}{n\pi}\left(\frac{1}{2}\cos n\theta_1 + \cos n\theta_2\right) = 0, \quad (1)$$

where $\theta_1$ and $\theta_2$ are the angles in radians for different voltage levels (FIG. 7, $V_{AB}$ versus ωt) and n is the harmonic order to be cancelled.

At each inverter output level, increasing switching pulses or using Pulse Width Modulation (PWM) techniques can control the output voltage magnitude and further depress the lower-order harmonic spectrum and reduce output filter (inductor and capacitor) size.

Embodiments are scaleable and allow for the number of inverter output levels to be increased by adding split-rail DC sources and inverter cells (unidirectional and bidirectional controlled switches).

Figure 10A:
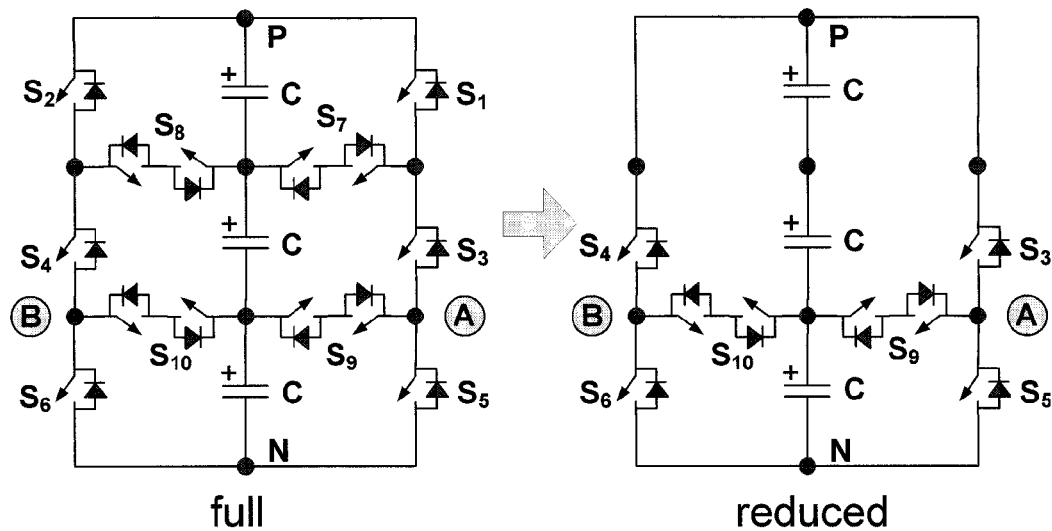
FIG. 10A is an exemplary 7-level inverter with ac output from the last inverter cell in full (left) and reduced (right) topologies.
Figure 10B:
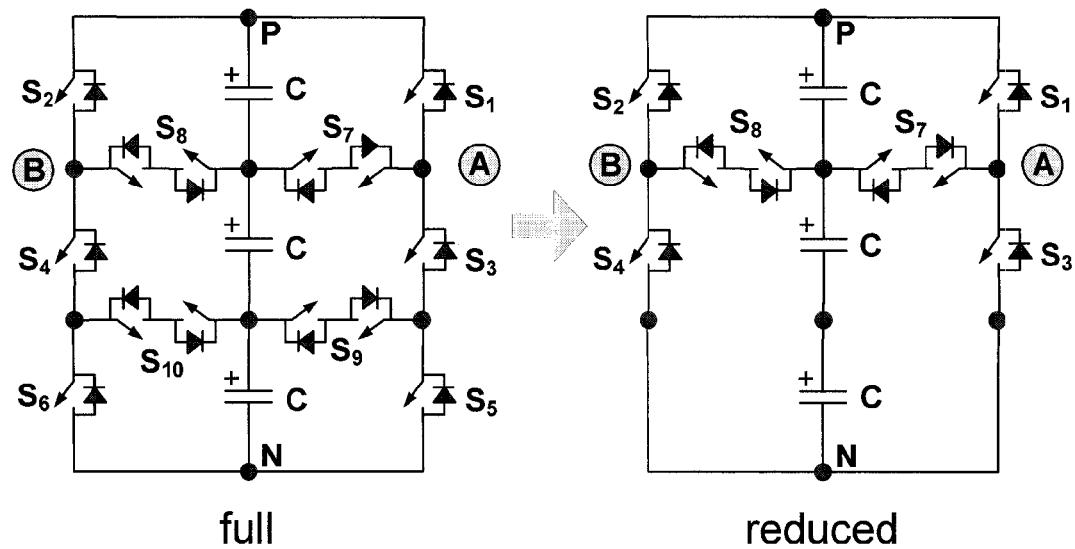
FIG. 10B is an exemplary 7-level inverter with ac output from the first inverter cell in full (left) and reduced (right) topologies.

FIGS. 10A and 10B (left) show 7-level inverters having full topologies with three equal DC sources (C), six unidirectional controlled switches $S_1$, $S_2$, $S_3$, $S_4$, $S_5$, $S_6$ and four bidirectional controlled switches $S_7$, $S_8$, $S_9$, $S_{10}$. The ac output may be obtained either across the last inverter cell (across cell nodes A and B, FIG. 10A) or the first inverter cell (across cell nodes A and B, FIG. 10B).

For a 7-level inverter full topology, there are redundant states to achieve one specific voltage level. For example, there are four choices to obtain zero voltage, three choices to obtain a $$+\frac{1}{3}V \text{ or } -\frac{1}{3}V,$$

two choices for $$+\frac{2}{3}V \text{ or } -\frac{2}{3}V,$$

and one choice for +V or −V voltage level. By sacrificing the voltage stress of a single switch, the amount of switches may be reduced and generate the same output. FIGS. 10A and 10B (right) show a reduction in the total number of unidirectional controlled switches from six to four and a reduction in the number of bidirectional controlled switches from four to two.

Figures 11, 12:
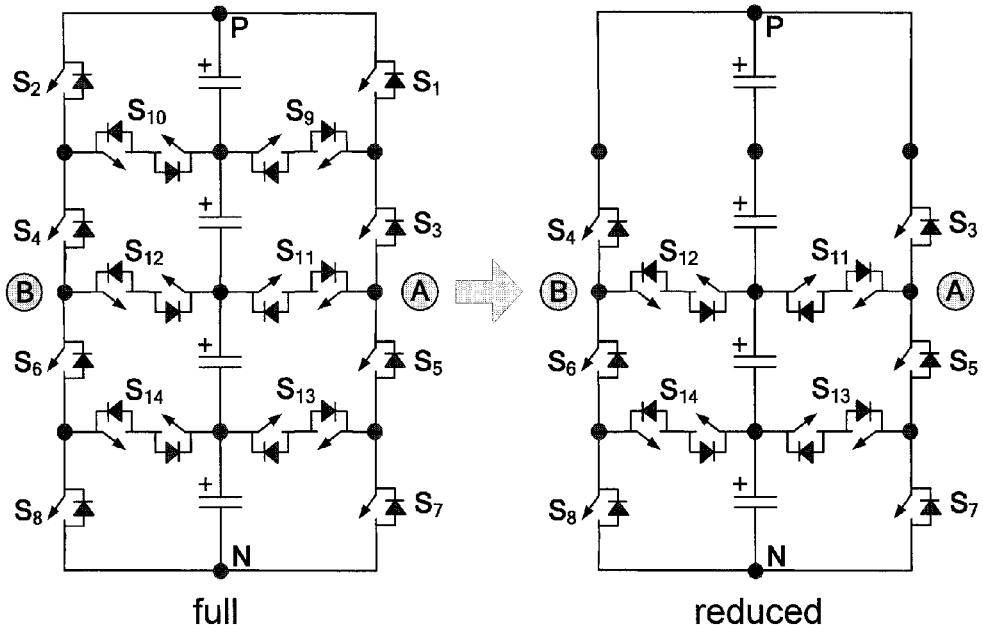
FIG. 11 is an exemplary 9-level inverter with ac output from the second inverter cell in full (left) and reduced (right) topologies.
FIG. 12 is a table showing the power switching for the 7-level full (left) and reduced (right) topologies in FIG. 10B.

FIG. 11 shows a similar reduction for a 9-level inverter. FIG. 12 shows a table listing all combinations of the switch states for both full and reduced 7-level inverter topologies shown in FIG. 10B.

For higher level inverters, the switch reduced topology is not unique. However, the minimum number of required semiconductor switches is unique for a desired m level inverter. Embodiments provide a method to arrive at the number of DC sources, and the number of unidirectional and bidirectional controlled switches for a desired multilevel inverter output.

FIG. 13 shows a table comparing different inverter levels and their required number of switching devices. For example, a 13-level inverter would require six split-rail DC sources. For a full topology version, each DC source is available. For a reduced topology version, the connections to some DC sources are omitted. For a 13-level inverter, the maximum reduction of switching elements is twelve arriving at a minimum number of twenty.

FIG. 14 is a table comparing the number of electrical components used in multilevel embodiment topologies with prior art multilevel inverter topologies. FIG. 13 shows that full topology embodiments are not desirable in terms of switch number, while reduced topology embodiments offer a substantial reduction in switches. For reduced topologies, the reverse blocking voltages of different semiconductor switches can be asymmetrical because some switches are across higher DC voltages than other switches. Additionally, using less split-rail DC sources, the voltage stress of switches is higher compared to the same level conventional topology.

Figure 15:
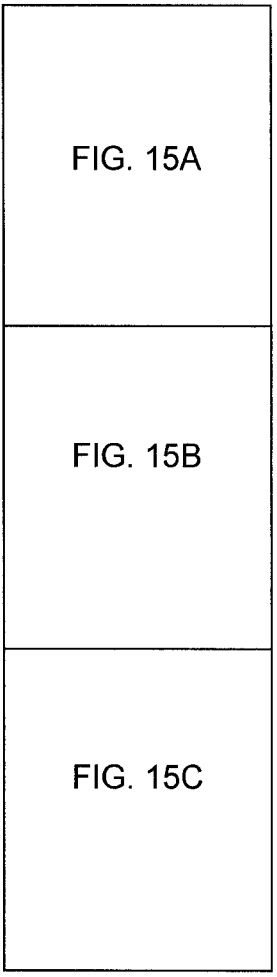
FIG. 15 is a multilevel inverter topology method.
Figure 15A:
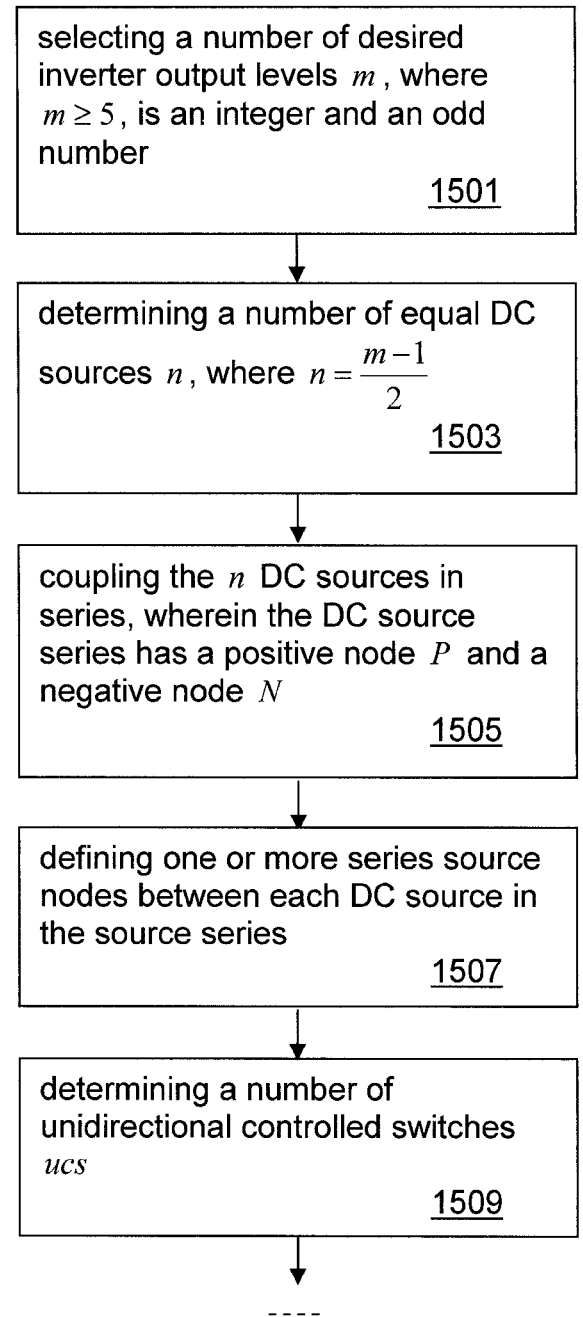
Figure 15B:
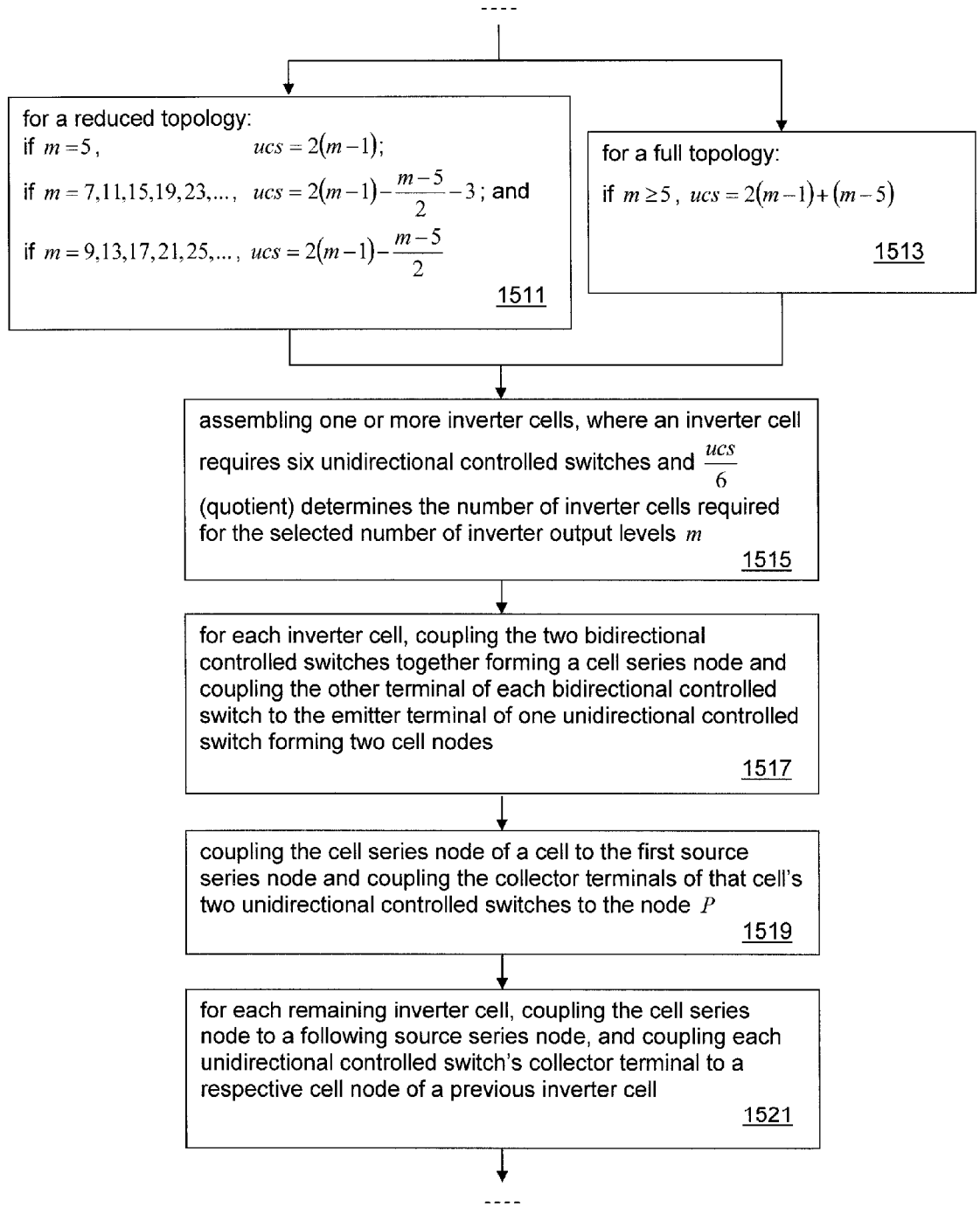
Figure 15C:
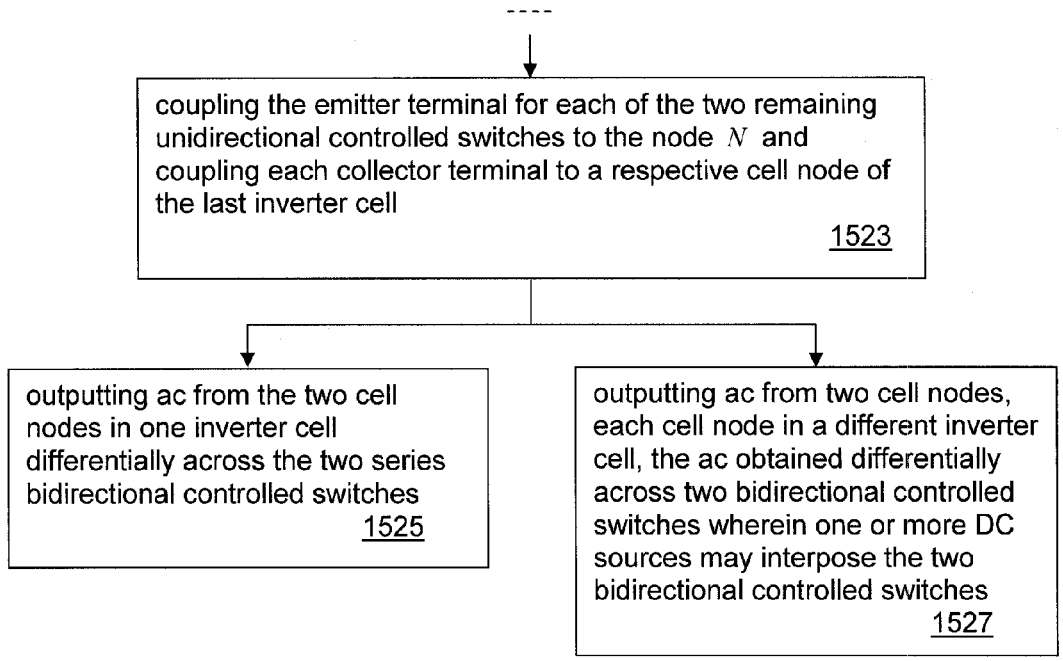

FIG. 15 shows a method for arriving at full and reduced multilevel inverter topology embodiments. A desired number of inverter output levels m is selected, where m≥5, is an integer and an odd number (step 1501). The number of DC sources n in series is determined based on the output levels m, where $$n = \frac{m-1}{2}.$$

The DC sources n may be n equal discrete DC supplies or n equal capacitors splitting a common DC supply (step 1503).

The n DC sources are coupled together in series (where the DC sources add together) and define a positive node P at the first DC source positive end, a negative node N at the last DC source negative end and one or more series source nodes at each DC source series coupling beginning with a first series source node after the first DC source (steps 1505, 1507). If n capacitors are used, one common DC supply (V) is coupled across the nodes P and N.

From the selected number of output levels m, a number of unidirectional controlled switches ucs is determined depending on whether a full (steps 1509, 1513) or reduced (steps 1509, 1511) inverter topology is desired. FIG. 13 shows the relationships of the full and reduced inverter topology unidirectional controlled switch requirements. From the total number ucs of unidirectional control switches, inverter cells are assembled.

An inverter cell comprises two unidirectional controlled switches and two bidirectional controlled switches. An inverter cell therefore requires six unidirectional controlled switches. From the total number ucs of unidirectional control switches, $$\frac{ucs}{6}$$

(quotient) determines the number of inverter cells for the number of selected inverter output levels m. Out of the total number ucs of unidirectional control switches, two unidirectional controlled switches remain (remainder) (step 1515). As described above, a bidirectional controlled switch comprises two unidirectional controlled switches coupled together, emitter-to-emitter.

For each inverter cell, the two bidirectional controlled switches are coupled together and their common node forms a cell series node. The other terminal of each bidirectional controlled switch is coupled to the emitter terminal of one unidirectional controlled switch, forming two cell nodes (step 1517). Each inverter cell therefore has one cell series node and two cell nodes.

Each inverter cell series node is coupled to a source series node. The first source series node is coupled to the cell series node for a cell and the collector terminals of that cell's two unidirectional controlled switches are coupled to the node P (step 1519). For each remaining inverter cell, the cell series node for a cell is coupled to a following source series node, and each unidirectional controlled switch's collector terminal is coupled to a respective cell node of a previous inverter cell (step 1521).

After all inverter cells have been coupled to respective source series nodes and previous inverter cell's cell nodes, two unidirectional controlled switches remain.

The emitter terminal for each of the two remaining unidirectional controlled switches is coupled to the node N and each collector terminal is coupled to a respective cell node of the last inverter cell (step 1523). The ac output may be taken differentially across two series bidirectional controlled switches in one inverter cell (step 1525), or from two cell nodes, where each cell node is in a different inverter cell and the ac obtained differentially across two bidirectional controlled switches where one or more DC sources may interpose the two bidirectional controlled switches (step 1527).

Alternatively, rather than starting at the first source series node, the last source series node is coupled to a cell series node for first cell and the emitter terminals of the cell's two unidirectional controlled switches are coupled to the node N. For each remaining inverter cell, the cell series node for a cell is coupled to a preceding source series node, and each unidirectional controlled switch's emitter terminal is coupled to a respective cell node of a previous inverter cell. The collector terminal for each of the two remaining unidirectional controlled switches is coupled to the node P and each emitter terminal is coupled to a respective cell node of the last inverter cell.

Figure 16:
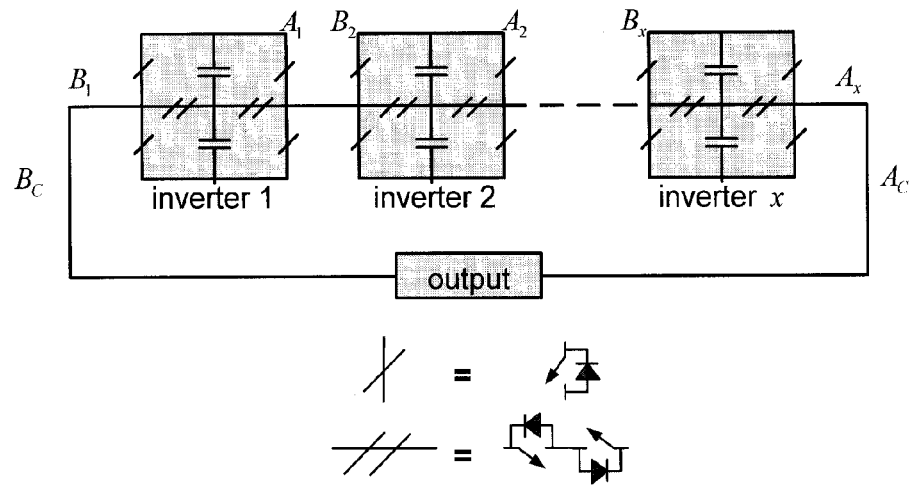
FIG. 16 is an exemplary inverter cascading topology.

One or more m− level inverters may be cascaded together to form a combined output having m+ levels. FIG. 16 shows three or more 5-level inverters inverter 1, inverter 2, . . . , inverter x coupled together in a series cascade. The symbology indicates inverter unidirectional controlled switches and bidirectional controlled switches used in the topology. The cascaded topology defines two output nodes $A_C$ and $B_C$ across the entire cascade. Each individual inverter inverter 1, inverter 2, . . . , inverter x used in a cascade has two differential output nodes $A_x, B_x$.

The output across two cascaded 5-level (m=5) inverters produces a 9-level cascaded output ($A_C, B_C$). If another 5-level inverter were cascaded, a 13-level inverter output would result. A cascade may be continued until a desired number of output levels are reached depending on the levels of the inverters used in the cascade. For example, a cascade of x 5-level inverters outputs (4x+1) levels.

Figure 17:
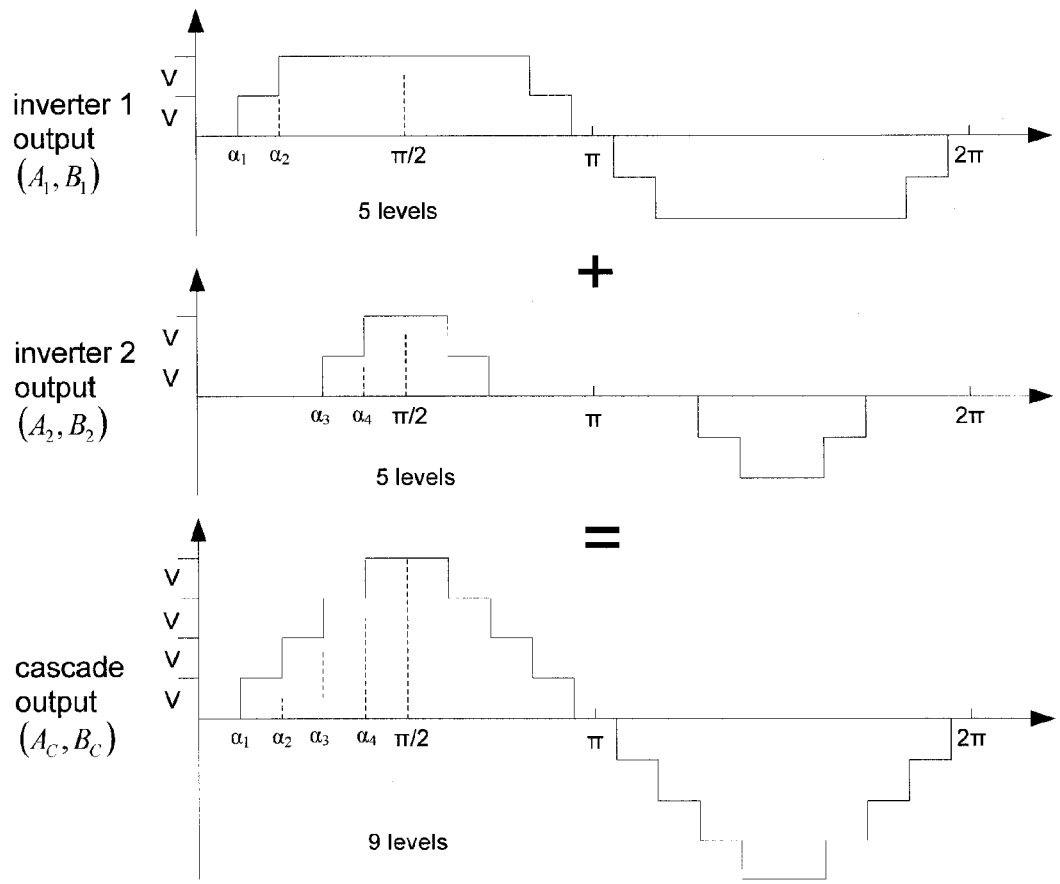
FIG. 17 is an exemplary output plot of two cascaded 5-level inverters.

FIG. 17 shows plots for two 5-level inverters inverter 1 $A_1, B_1$, inverter 2 $A_2, B_2$ and a plot of their cascaded output $A_C, B_C$ over one cycle ($2\pi$). A 9-level (with x=2; 4x+1=9) output is obtained. The individual DC sources V in inverter 1 and inverter 2 add depending when their DC sources are switched ($\alpha_1, \alpha_2, \alpha_3, \alpha_4, \ldots$) during the cycle. All of the DC sources used in one inverter are equal and each inverter's DC sources are isolated from another inverter's DC sources. However, each individual inverter in a cascade may have DC source voltages that are different from another inverter in the cascade, and inverter levels can be different from one another.

The cascade topology reduces the voltage and current limitations of the power semiconductors used, and with increasing inverter levels, the output approaches a pure sinusoidal ac waveform exhibiting low distortion without requiring passive filtering components.

Embodiments are single phase multilevel inverter topologies using a full-bridge approach with bidirectional interconnections. Compared to prior art diode-clamped or flying-capacitor multilevel topologies, the required split-rail DC sources are less, and the number of required power switches can be reduced by removing redundant switching states. Using asymmetrical DC sources, the output levels can be significantly increased. Embodiments can be applied to solar photovoltaics (micro-inverters) and energy storage (multiple battery cells) applications.

One or more embodiments of the present invention have been described. Nevertheless, it will be understood that various modifications may be made without departing from the spirit and scope of the invention. Accordingly, other embodiments are within the scope of the following claims.

What is claimed is:

1. A single phase inverter topology method comprising:
   selecting a number of desired inverter output levels m, where m≥5, is an integer and an odd number;
   determining a number of equal DC sources n, where $$n = \frac{m-1}{2};$$

coupling the number of equal DC sources in series to create a source series, wherein the source series has a first DC source that defines a positive node P and a last DC source that defines a negative node N;
   defining one or more source series nodes between each DC source in the source series wherein a first source series node, of the one or more source series nodes, is positioned after the first DC source that defines the positive node P and a last source series node, of the one or more source series nodes, is positioned before the last DC source that defines the negative node N;
   determining a total number of unidirectional controlled switches ucs;
   assembling a number of inverter cells equal to a quotient of $$\frac{ucs}{6},$$

each one of the number of inverter cells comprising six unidirectional controlled switches;
   for each one of the number of inverter cells, arranging four of the six unidirectional controlled switches as two bidirectional controlled switches, leaving two remaining unidirectional control switches in each one of the number of inverter cells;
   for each one of the number of inverter cells, coupling first terminals of the two bidirectional controlled switches together forming a cell series node and coupling second terminals of each of the two bidirectional controlled switches to emitter terminals of separate ones of the two remaining unidirectional controlled switch switches, forming two cell nodes;
   coupling the cell series node of a first one of the number of inverter cells to the first source series node and coupling collector terminals of the cell's two remaining unidirectional controlled switches to the positive node P;

only if there are one or more remaining inverter cells, for each remaining inverter cell, coupling the cell series node to a source series node incrementally more distant from the positive node in the source series than a source series node last coupled to a cell series node, and coupling each unidirectional controlled switch's collector terminal to a respective cell node of an inverter cell last coupled to the cell series; and coupling the emitter terminal for each one of the total number of unidirectional controlled switches that is not assembled in any inverter cell to the negative node N and coupling the collector terminal for each one of the total number of unidirectional controlled switches that is not assembled in any inverter cell to a respective cell node of the inverter cell last coupled to the cell series.

2. The method according to claim 1 wherein arranging four of the six unidirectional controlled switches as two bidirectional controlled switches further comprises coupling emitters of pairs of unidirectional controlled switches.

3. The method according to claim 1 further comprising outputting ac from one inverter cell of the number of inverter cells, differentially across the two series bidirectional controlled switches from the two cell nodes.

4. The method according to claim 1 further comprising outputting ac from two cell nodes, each cell node in a different inverter cell, the ac obtained differentially across two bidirectional controlled switches wherein one or more DC sources interpose the two bidirectional controlled switches.

5. The method according to claim 1 wherein determining the number of unidirectional controlled switches ucs comprises:

for a reduced topology:

if $m = 5$, $ucs = 2(m-1)$;

if $m = 7, 11, 15, 19, 23, \ldots$, $ucs = 2(m-1) - \frac{m-5}{2} - 3$; and if $m = 9, 13, 17, 21, 25, \ldots$, $ucs = 2(m-1) - \frac{m-5}{2}$.

6. The method according to claim 1 wherein determining the number of unidirectional controlled switches ucs comprises:

for a full topology:

if m≥5, ucs=2(m−1)+(m−5).

7. The method according to claim 1 wherein at least one of the total number of unidirectional controlled switches is a power semiconductor with an anti-parallel diode across its switching junction.

8. The method according to claim 7 wherein the power semiconductor is an Insulated-Gate Bipolar Transistor (IGBT).

9. The method according to claim 1 wherein at least one DC source of the number of DC sources n is a capacitor.

10. The method according to claim 1 wherein at least one DC source of the number of DC sources n is a DC power supply.

11. The method according to claim 1 wherein at least one DC source of the number of DC sources n is a battery.

12. A single phase inverter topology method comprising:

selecting a number of desired inverter output levels m, where m≥5, is an integer and an odd number;

determining a number of equal DC sources n, where $$n = \frac{m-1}{2};$$

coupling the number of equal DC sources in series to create a source series, wherein the source series has a first DC source that defines a positive node P and a last DC source that defines a negative node N;

defining one or more source series nodes between each DC source in the source series wherein a first source series node, of the one or more source series nodes, is positioned after the first DC source that defines the positive node P and a last source series node, of the one or more source series nodes, is positioned before the last DC source that defines the negative node N;

determining a total number of unidirectional controlled switches ucs;

assembling a number of inverter cells equal to a quotient of $$\frac{ucs}{6};$$

each one of the number of inverter cells comprising six unidirectional controlled switches;

for each one of the number of inverter cells, arranging four of the six unidirectional controlled switches as two bidirectional controlled switches, leaving two remaining unidirectional control switches in each one of the number of inverter cells;

for each one of the number of inverter cells, coupling first terminals of the two bidirectional controlled switches together forming a cell series node and coupling second terminals of each of the two bidirectional controlled switches to emitter terminals of separate ones of the two remaining unidirectional controlled switches, forming two cell nodes;

coupling the cell series node of a first one of the number of inverter cells to the last source series node and coupling the emitter terminal for each one of the total number of unidirectional controlled switches that is not assembled in any inverter cell to the negative node N and coupling each collector terminal for each one of the total number of unidirectional controlled switches that is not assembled in any inverter cell to a respective cell node of the first inverter cell;

only if there are one or more remaining inverter cells, for each remaining inverter cell, coupling the cell series node to a source series node incrementally more distant from the negative node in the source series than a source series node last coupled to an inverter cell and coupling each cell node to a unidirectional controlled switch's collector terminal of an inverter cell last coupled to a source series node; and for the last inverter cell, coupling the collector terminals of the last cell's two unidirectional controlled switches to the positive node P.

13. The method according to claim 12 wherein arranging four of the six unidirectional controlled switches as two bidirectional controlled switches further comprises coupling emitters of pairs of unidirectional controlled switches.

14. The method according to claim 12 further comprising outputting ac from one inverter cell of the number of inverter cells, differentially across the two series bidirectional controlled switches from the two cell nodes.

15. The method according to claim 12 further comprising outputting ac from two cell nodes, each cell node in a different inverter cell, the ac obtained differentially across two bidirectional controlled switches wherein one or more DC sources interpose the two bidirectional controlled switches.

16. The method according to claim 12 wherein determining the number of unidirectional controlled switches ucs comprises:

for a reduced topology:

if $m = 5$, $ucs = 2(m - 1)$;

if $m = 7, 11, 15, 19, 23, \ldots$, $ucs = 2(m - 1) - \frac{m-5}{2} - 3$; and if $m = 9, 13, 17, 21, 25, \ldots$, $ucs = 2(m - 1) - \frac{m-5}{2}$.

17. The method according to claim 12 wherein determining the number of unidirectional controlled switches ucs comprises:

for a full topology:

if $m \geq 5$, ucs=2(m−1)+(m−5).

18. The method according to claim 12 wherein at least one of the total number of unidirectional controlled switches is a power semiconductor with an anti-parallel diode across its switching junction.

19. The method according to claim 18 wherein the power semiconductor is an Insulated-Gate Bipolar Transistor (IGBT).

20. The method according to claim 12 wherein at least one DC source of the number of DC sources n is a capacitor.

21. The method according to claim 12 wherein at least one DC source of the number of DC sources n is a DC power supply.

22. The method according to claim 12 wherein at least one DC source of the number of DC sources n is a battery.

\* \* \* \* \*